United States Patent
Erez et al.

(10) Patent No.: US 8,359,435 B2
(45) Date of Patent: Jan. 22, 2013

(54) OPTIMIZATION OF SOFTWARE INSTRUCTION CACHE BY LINE RE-ORDERING

(75) Inventors: Revital Erez, Tel-Aviv (IL); Brian Flachs, Georgetown, TX (US); Mark Richard Nutter, Austin, TX (US); John Kevin Patrick O'Brien, South Salem, NY (US); Ulrich Weigand, Holzgerlingen (DE); Ayal Zaks, Misgav (IL)

(73) Assignee: International Business Machines Corporation, Armonk, NY (US)

( * ) Notice: Subject to any disclaimer, the term of this patent is extended or adjusted under 35 U.S.C. 154(b) by 200 days.

(21) Appl. No.: 12/639,010

(22) Filed: Dec. 16, 2009

(65) Prior Publication Data

US 2011/0145503 A1 Jun. 16, 2011

(51) Int. Cl.
*G06F 12/00* (2006.01)
(52) U.S. Cl. .................. 711/137; 711/118; 711/125
(58) Field of Classification Search .................. 711/137, 711/118, 125
See application file for complete search history.

(56) References Cited

U.S. PATENT DOCUMENTS

| | | | |
|---|---|---|---|
| 717,140 | A | 12/1902 | Thomson |
| 7,243,195 | B2 | 7/2007 | O'Brien et al. |
| 2007/0240117 | A1* | 10/2007 | Wiles et al. .................. 717/124 |
| 2007/0283098 | A1* | 12/2007 | O'Brien et al. ............... 711/118 |
| 2008/0005473 | A1* | 1/2008 | Chen et al. .................... 711/118 |
| 2009/0287903 | A1* | 11/2009 | Hsu et al. ..................... 711/213 |
| 2010/0088673 | A1* | 4/2010 | Chen et al. .................... 717/110 |

OTHER PUBLICATIONS

Jason E. Miller and Anant Agarwal, "Software-based instruction caching for embedded processors", ASPLOS-XII: Proceedings of the 12th international conference on Architectural support for programming languages and operating systems}, 2006.

Jason E. Miller, Ph.D. thesis on "Software Instruction Caching". URL: http://scholar.google.co.il/scholar?cluster=2526986415706968488&hl=iw&as_sdt=2000.

Marc Gonzàlez et al, "Hybrid access-specific software cache techniques for the cell BE architecture", Proceedings of the 17th international conference on Parallel architectures and compilation techniques, Oct. 25-29, 2008, Toronto, Ontario, Canada.

Tong Chen et al, "Prefetching irregular references for software cache on cell", Proceedings of the sixth annual IEEE/ACM international symposium on Code generation and optimization, Apr. 5-9, 2008, Boston, MA, USA.

Tobias Werth et al, "Dynamic Code Footprint Optimization for the IBM Cell Broadband Engine", IWMSE'09, May 18, 2009, Vancouver, Canada, 2009 IEEE.

\* cited by examiner

*Primary Examiner* — Hong Kim
(74) *Attorney, Agent, or Firm* — Daniel Kligler

(57) ABSTRACT

A method for computing includes executing a program, including multiple cacheable lines of executable code, on a processor having a software-managed cache. A run-time cache management routine running on the processor is used to assemble a profile of inter-line jumps occurring in the software-managed cache while executing the program. Based on the profile, an optimized layout of the lines in the code is computed, and the lines of the program are re-ordered in accordance with the optimized layout while continuing to execute the program.

21 Claims, 3 Drawing Sheets

OPTIMIZATION OF SOFTWARE INSTRUCTION CACHE BY LINE RE-ORDERING

BACKGROUND

The present invention relates generally to computer software, and particularly to methods and systems for caching of software instructions.

A computer processing unit functions by processing data elements through assorted registers in accordance with instructions provided by a computer program. The processing unit executes instructions in the form of machine language, which are typically low-level instructions used to coordinate which data elements are processed through each of the registers. Most software, however, is written in higher-level programming code, with strong abstraction from the details of the computer, which have the advantages of being human-readable and of embodying comparatively complex processing operations using relatively short commands. A compiler typically receives the high-level programming code (source code), and based upon the design of the compiler itself, generates the machine language that is readable by the processing unit.

Typically, caches are designed so that they function transparently to the software running on the processing unit. Customized hardware checks the cache for needed data, fetching data from a larger memory and managing which subset of the total data is currently in the cache. This design makes programming processing units with caches relatively easy, since the programmer is not required to explicitly manage the memory hierarchy. Hardware caches, however, have some significant drawbacks: They are complex subsystems that require substantial effort in initial design, timing closure and verification, thereby increasing time-to-market and development costs. The cache uses tags (typically containing indices of each datum in main memory that has been cached) and control logic that consume considerable area and power, which is dedicated solely to caching and is therefore unavailable for extra computation or storage, thus increasing manufacturing costs.

Use of a software-managed cache is a solution for local storage of remote data in systems that do not have a hardware cache, such as synergistic processing elements (SPEs) in the Cell broadband multiprocessor engine (developed jointly by Sony, Toshiba and IBM). The term "software-managed cache" (also referred to as a "software-based cache" or simply a "software cache") denotes a cache that is managed in software by the processor that uses the cache, without dedicated cache management hardware. Software-managed caches can be used for caching of both data and instructions. Using such software-managed caches, a program can load the data or instructions it requires on an as-needed basis into the cache from global address space. Miller and Agarwal, for example, describe this sort of design of an instruction cache in "Software-based Instruction Caching for Embedded Processors," *ASPLOS-XII: Proceedings of the* 12*th International Conference on Architectural Support for Programming Languages and Operating Systems* (2006).

BRIEF SUMMARY

An embodiment of the present invention provides a method for computing, which includes executing a program, including multiple cacheable lines of executable code, on a processor having a software-managed cache. A run-time cache management routine running on the processor is used to assemble a profile of inter-line jumps occurring in the software-managed cache while executing the program. Based on the profile, an optimized layout of the lines in the code is computed, and the lines of the program are re-ordered in accordance with the optimized layout while continuing to execute the program.

Other embodiments provide computer software products and computing apparatus.

The present invention will be more fully understood from the following detailed description of the embodiments thereof, taken together with the drawings in which:

DETAILED DESCRIPTION

Overview

In a software-managed instruction cache system (referred to for short as a "SW iCache"), the program whose instructions are to be cached is partitioned ahead of time into cache lines by a static tool chain, which typically comprises a compiler and a linker. During run-time, certain lines may conflict and evict each other from the iCache, due to the predetermined layout of the lines. Embodiments of the present invention that are described hereinbelow provide methods for detecting and avoiding such conflicts, as well as other performance inefficiencies in caching of program lines, in order to accelerate the performance of a SW iCache.

A processor with a SW iCache typically uses a run-time cache management routine to handle line jumps and cache line replacement (commonly referred to as "eviction"). In embodiments of the present invention, this run-time routine is extended to first collect relevant profiling information—specifically, a profile of inter-line jumps occurring in the iCache—while the processor executes a given program. Based on the profile, the processor computes an optimized layout of the lines in the code and then reorders the lines of the program in accordance with the optimized layout while continuing to execute the program.

This optimization takes place as the processor runs executable code, which has already been compiled from source code. In contrast to compiler-based methods of profiling and optimization, this run-time method takes place as the program executes and requires no programmer intervention or recompilation. Furthermore, by performing the optimization during run-time, the processor optimizes the program based on the actual workload and can thus adapt the performance of the SW iCache to changes in application behavior that may occur while the program is running.

System Description

Figure 1:
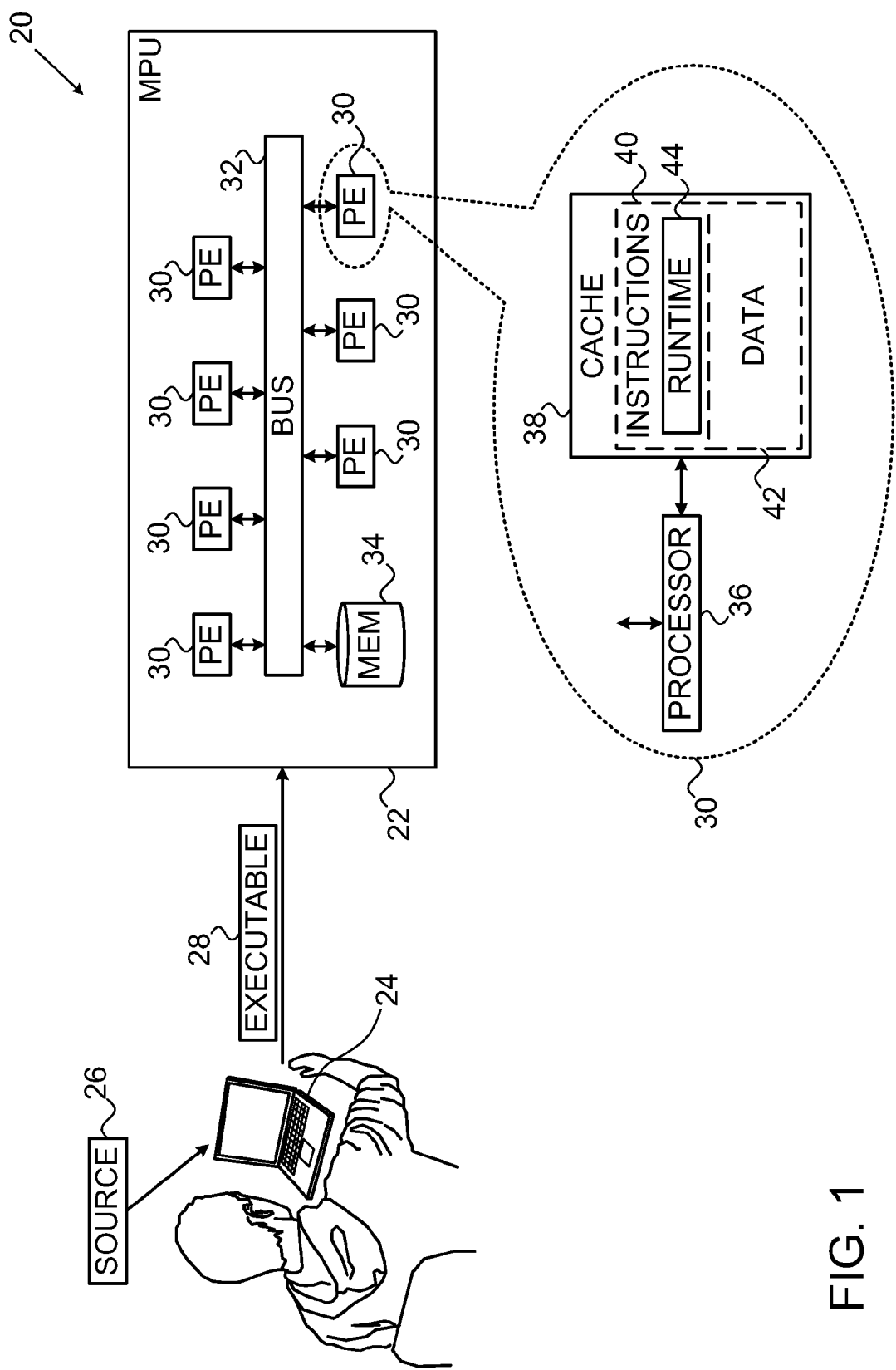
FIG. 1 is a block diagram that schematically illustrates a computer system having a software-managed cache, which operates in accordance with an embodiment of the present invention.

FIG. 1 is a block diagram that schematically illustrates a computer system 20 having a software-managed cache, in accordance with an embodiment of the present invention. The software-managed cache is used, in the present example, in a multi-processor unit 22, such as the Cell processor. Executable code 28 for execution by unit 22 is typically compiled externally by a workstation 24, based on source code 26 furnished by a programmer. The workstation compiles and links the code and arranges the executable code instructions in code lines that are compatible in size with the iCaches in unit 22. Each line typically comprises multiple instructions. Such methods of compilation and linking are known in the art.

Unit 22 comprises multiple processing elements 30, which communicate via a bus 32. The code lines for execution by the processing elements, as well as data, are held in a main memory 34. As shown in the inset in FIG. 1, each processing element comprises a processor 36 and a local cache 38, comprising an instruction cache (iCache) 40 and a data cache 42. A run-time cache management routine 44, running on processor 36, reads lines of instructions and data from memory 34 into cache 38 as needed and evicts lines when necessary to make room for new ones. Routine 44 also gathers profile information for use by processor 36 (or by another processor in multi-processor unit 22) in optimizing the layout of the instruction lines, as described in detail hereinbelow. Unit 22 may also apply certain optimizations to data cache 42, but these optimizations are beyond the scope of the present patent application.

Embodiments of the present invention are described herein by way of example, for the sake of clarity, with reference to the elements of system 20. The principles of the present invention, however, are by no means limited to this specific system configuration and may similarly be applied in substantially any system that uses software-based cache management, including single-processor computers, as well as multi-processor devices.

The cache profiling and optimization functions that are described herein are typically implemented in software, including run-time routine 44. Alternatively, some of the optimization functions may be carried in software out on another processor, external to the multi-processor unit. The software for profiling and optimization, as well as for run-time cache management, may be provided in electronic form, over a network, for example. Alternatively or additionally, the software may be stored on tangible computer-readable storage media, such as optical, magnetic, or electronic memory media.

Figure 2:
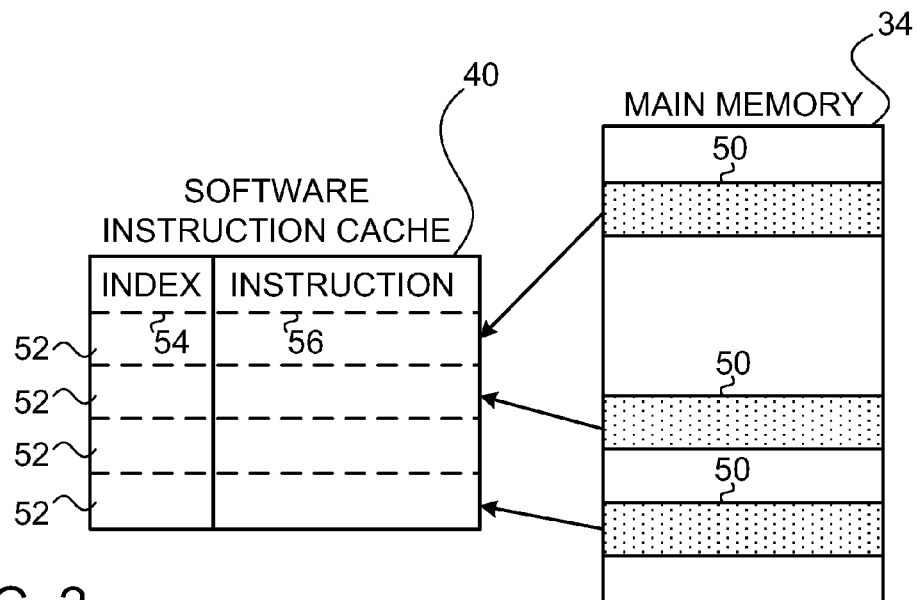
FIG. 2 is a block diagram that schematically illustrates a mapping from a main memory to a cache, in accordance with an embodiment of the present invention.

FIG. 2 is a block diagram that schematically illustrates mapping of cache lines from main memory 34 to iCache 40, in accordance with an embodiment of the present invention. The compiler or linker running on workstation 24 partitions executable code 28 into lines 50 and gives each line an address (for example, a 32-bit address) in main memory 34. As noted above, each line 50 contains multiple code instructions (which are typically 4 bytes each). Each such line is mapped at execution time to an address in iCache 40. The length of each line of code may be 1,024 bytes, for instance, while the size of the iCache is 256 Kbytes. In the following example, it is assumed that the iCache contains sixteen entries.

In these typical system conditions, the line number is thus given by line=(main memory address)/1024. Run-time routine 44 accesses entries 52 in the iCache using an index 54 given by the four least significant bits of the line number: index=line & 0xf. Each such entry contains instructions 56 taken from the corresponding line 50 in memory 34. The address of an instruction in the iCache is given by the eighteen least significant bits of the main memory address: iCache address=main memory address & 256K−1. In view of the small number of cache entries 52 relative to the number of lines 50 in memory, it can be seen that only a small part of the executable code can typically be held in iCache 40 at any given time, and cache conflicts are likely to occur.

During execution or a program, when an instruction in one line of iCache 40 requires a jump to an instruction in some other line, processor 36 invokes run-time routine 44. If necessary, the run-time routine brings the desired line into the cache from memory 34, typically evicting some other line. The processor can then re-target the jump to the new location of the destination address in the appropriate line in the cache, and thus avoid calling the run-time routine in subsequent executions of the jump. When a line is evicted, such re-targeted jumps must again be targeted to the run-time routine. Therefore, there is an overhead cost associated with re-targeting, and not all jumps should necessarily be re-targeted for optimal performance.

In embodiments that are described hereinbelow, run-time routine 44 gathers profiling information regarding which jumps are taken and how often and the eviction of lines containing the jump source or destination address. This profiling information is used in finding ways to optimally pack instructions into lines, allocate or order the lines, and/or decide which jumps to re-target so as to minimize the number of evictions and the overall performance overhead. The run-time routine collects the desired profile information during execution, and processor 36 (or another element in system 20) uses the information in optimizing aspects of the program, as described in detail hereinbelow.

Methods of iCache Optimization

Figure 3:
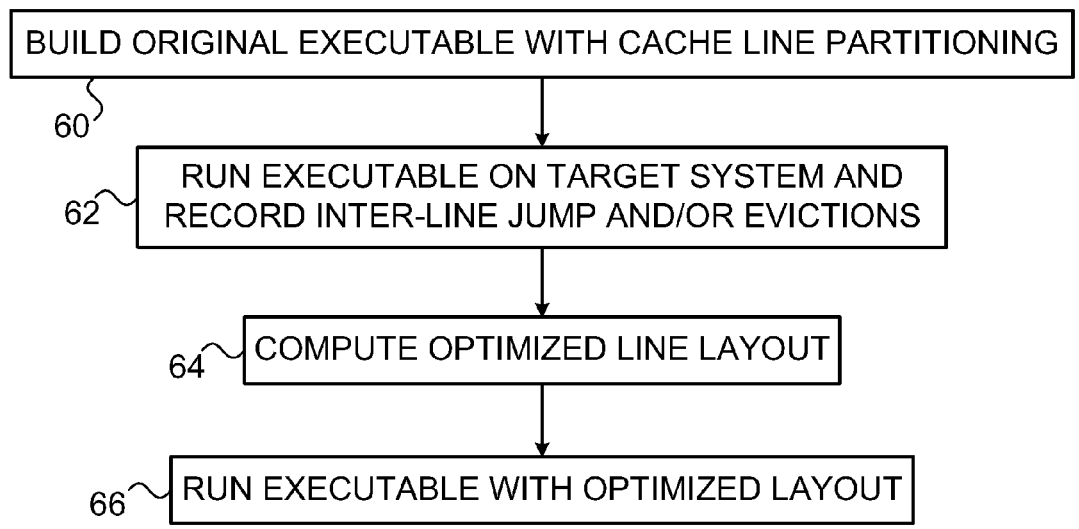
FIG. 3 is a flow chart that schematically illustrates a method for on-line optimization of code for execution on a processor having a software-managed instruction cache, in accordance with an embodiment of the present invention.

FIG. 3 is a flow chart that schematically illustrates a method for on-line optimization of code for execution on a processor having a software-managed instruction cache (SW iCache), in accordance with an embodiment of the present invention. As noted above, this method is described here, for the sake of clarity, with reference to the elements of system 20 that are shown in FIGS. 1 and 2, but the method may similarly be applied, mutatis mutandis, in other systems that use a SW iCache. A pseudocode listing corresponding to the operations shown in the flow chart is presented below in an Appendix.

Workstation 24 compiles and links source code 26 to build executable program 28, at a building step 60. The workstation uses static assumptions regarding program flow in order to partition program instructions into lines. (The workstation may also use profile information for this purpose, but the use of profiling at the compilation stage complicates the compilation process, and the profiles used for this purpose may not be representative of the actual run-time workload.) Unit 22 then runs the executable program in a profile collecting mode, in a profile collection step 62. In this mode, processor 36 uses iCache 40 to hold program lines 50 that are brought in by run-time routine 44, but it does not re-target inter-line jumps. Rather, at this stage, the run-time routine counts the inter-line jumps for different lines in the code. Additionally or alternatively, the run-time routine may collect other profile data, such as data regarding line evictions from the iCache. Step 62 continues until sufficient profile data have been collected for subsequent optimization.

Alternatively, rather than collecting statistics within unit 22, branches occurring in the program during step 62 may be retargeted to a "trampoline" memory location, which contains the counting code and may be executed outside the array of processing elements and caches. In this manner, it is possible to collect statistics without the added overhead on run-time routine 44.

The burden of profile collection at step 62 may be reduced by focusing on line evictions, with the aim of resolving conflicts between addresses that are mapped to the same cache line. In this case, it is possible to exclude some program branches from profile collection. For example, a major performance problem with evictions typically occurs when the target line in a jump displaces the source line, particularly when the eviction occurs in a loop. Only branches of the program that can potentially jump by a distance comparable to the cache size can cause this sort of problem (as in subroutine calls out-of-file or via function pointers). To focus on such braches, the compiler at step 60 may recognize the cases in which branches will not cause a problem, and may mark these branches in the executable code. Upon encountering the mark in a given branch at an inter-line jump, processor 36 may simply re-target the branch immediately, without collecting profile information, and will thus reduce the overhead of profile collection in step 62.

Processor 36 (or another computing element) computes an optimized layout of the lines in the program based on the profile data, at an optimization step 64. This computation may take place while the program continues to run on unit 22. The re-layout may operate, for example, by applying a greedy optimization algorithm based on the counter values from step 62 in order to find a new layout that will execute more efficiently (typically with fewer calls to run-time routine 44). Formally, the new layout is a permutation P of the original layout, wherein the line that was in position i is repositioned at position P[i]. If step 64 is off-loaded to some other computing element, processor 36 may immediately start re-targeting inter-line jumps while the optimization is in progress.

In addition to or instead of computing a new layout at step 64 based on the profiling information, the processor can compute the Average number of Times an inter-line jump was Executed Before the line containing the jump or its destination address was Evicted ("AETBE"). The processor may mark jumps having a small AETBE as being not worth re-targeting. Because changing the layout of the lines may affect the AETBE, it may be advantageous to compute and implement the optimized layout, and only afterwards collect and apply the AETBE statistics.

Once the new, optimized layout has been computed, processor 36 switches over to the new layout for continued execution, at an optimized execution step 66. There are a number of possible ways to implement this step, for example:

- The processor may "re-link" the code, moving lines around and fixing all inter-line jumps. This approach has a large up-front overhead (although it may, too, be offloaded to another processor). Once the optimized version of the code is ready, processor 36 evicts all lines from iCache 40 and continues execution normally, using the optimized version.
- To reduce the up-front overhead, at the cost of additional cache overhead during execution, processor 36 may evict all lines from iCache 40 and continue to run original executable code 28. While running the code, however, run-time routine 44 converts each required jump to line i outside the cache into a jump to the optimized location in line P[i], and places the target line inside the cache accordingly.

The above two modes of implementation may be used together: One program thread, for example, may immediately start to handle jumps as they occur in the original executable code, while another thread works on "re-linking."

Relocation of lines at step 66 may be limited in order to avoid violating application binary interface (ABI) restrictions. Such restriction may apply in particular with regard to function pointers. For example, the compiler may mark lines in the executable code to indicate which lines contain function entry points, and the processor may then avoid relocating these lines.

The processor may also update hints of jumps at step 66, since these hints point to the positions of lines in the cache. (By way of illustration, a hint instruction of this sort is included in Example 3 below.)

As another alternative, for faster "re-linking," the compiler in workstation 24 may statically generate a number of possible layouts at step 60. The processor at step 64 may then simply choose the layout that is expected to give the best results, based on the profile information from step 62.

Steps 62, 64 and 66, as described above, may be repeated from time to time in order to further optimize the program and adapt to changes that may occur during run-time. For example, run-time routine 44 may keep track of program branches that have undergone re-ordering and may periodically return them to their previous order in order to update the previous profile information. The previous optimization may then be reviewed and, if necessary, modified.

The method described above focuses on optimizing line order and deciding which jumps to re-target so as to minimize the number of evictions. Additionally or alternatively, the profile information collected at step can be used to alter and optimize the way in which instructions are packed into code lines. For this purpose, it would be desirable to collect statistics on intra-line jumps, but this information is not directly available because such jumps normally do not invoke run-time routine 44. Instead, the processor may use inter-line jump statistics, which correlate with how often the entry-points and exit-points in a line are reached, coupled with static control-flow analysis within the line to identify instructions that were not executed (or executed very infrequently). The compiler may then re-pack the frequently-executed instructions together in a single line or lines.

Alternatively, the compiler may place each basic block in a separate line in the original executable code, so that all jumps become inter-line. This approach will enable run-time routine 44 to recognize and gather statistics on all jumps in the program, but it will incur a high performance overhead in the profile collection step.

EXAMPLES

The following examples demonstrate applications of the principles of the methods defined above, based on sample lines of code executed by processor 36. The instruction "jmp RT" in the examples below refers to jumps to run-time routine 44.

Example 1

Execution Flow of iCached Program that Demonstrates Reordering of Lines Based on Profiling Information Step 62—Profile Collection

---

...
1) Current instruction to execute:
  jmp RT, original branch target: 0x103228
    Memory address 0x103228 maps to line number 0x40c
    and to entry 12 in the iCache.

The run-time routine fetches line 0x40c from
memory into entry 12.
...
2) Current instruction to execute:
jmp RT, original branch target: 0x83000
    0x83000 maps to line number 0x20c and to entry 12
    in the cache.
    The run-time routine evicts line 0x40c and fetches
    0x20c from memory into entry 12.
    Record 0x40c and 0x20c as colliding lines for this
    iCache entry 12.
...
3) Current instruction to execute:
jmp RT, original branch target: 0x1031f8
    0x1031f8 maps to line number 0x40c and to entry 12
    in the cache.
    The run-time routine evicts line 0x20c and fetches
    0x40c from memory into entry 12.
    Increase the counter that records 0x40c and 0x20c
    as colliding lines for iCache entry 12.
...
4) Current instruction to execute:
jmp RT, original branch target: 0x103220
    0x103220 maps to line number 0x40c which is
    already in the cache.
...

Step 64: Line Reordering Based on Profile Counters

Assuming the scenario above continues, in which line 0x40c and line 0x20c keep evicting each other from the cache, then line 0x40c and line 0x20c should reside in separate cache entries in order to reduce collision. Therefore, the following new address is assigned to line 0x20c:

New Permutation:

line 0x20c→line 0x215 line 0x215→line 0x20c

Step 66: Optimized Execution

Evict the cache.

...
1) Current instruction to execute:
jmp RT, original branch target: 0x83150
    0x83150 maps to line number 0x20c, which is
    remapped to line 0x215 and to entry 5 in the cache.
    Re-write instruction 1 to: 'br 0x5558' (branch
    directly to the address in the iCache).
...
2) Current instruction to execute:
jmp RT, original branch target: 0x1031f8
    0x1031f8 maps to line number 0x40c and to entry 12
    in the cache.
    The run-time routine fetches 0x40c from memory
    into entry 12.
    Re-write instruction 2 to: 'br 0x31f8'.
...
3) Current instruction to execute:
jmp RT, original branch target: 0x431f8
    0x431f8 maps to line number 0x10c and to entry 12
    in the cache.
    The run-time routine fetches line 0x10c from
    memory into entry 12 and evicts line 0x40c.
    Re-write instruction 2 to 'jmp RT, original branch
    target: 0x1031f8' (jump back to the run-time
    routine).
    Re-write instruction 3 to 'br 0x31f8' (jump
    directly to the iCache).

Example 2

Execution Flow of iCached Program that Demonstrates a Decision to Re-Target an Inter-Line Jump Based on Profile Information Step 62—Profile Collection ...
1) Current instruction to execute:
0x861d8: jmp RT, original branch target: 0x103228
    0x103228 maps to line number 0x40c and to entry 12
    in the iCache.
    The run-time routine fetches line 0x40c from
    memory into entry 12.
    Record the fact that this branch (0x861d8 –>
    0x103228) [source –> target address] was executed
    once.
...
2) Current instruction to execute:
0x44c08: jmp RT, original branch target: 0x1031f8
    0x1031f8 maps to line number 0x40c and to entry 12
    in the cache.
    This line already exists in the iCache.
    Record the fact that this branch (0x44c08 –>
    0x1031f8) was executed once.
...
3) Current instruction to execute:
0x861d8: jmp RT, original branch target: 0x103228
    0x103228 maps to line number 0x40c and to entry 12
    in the iCache.
    This line already exist in the iCache.
    Record the fact that this branch (0x861d8 –>
    0x103228) was now executed twice.
...
4) Current instruction to execute:
0x861d8: jmp RT original branch target: 0x103228
    0x103228 maps to line number 0x40c and to entry 12
    in the iCache.
    This line already exist in the iCache.
    Record the fact that this branch (0x861d8 –>
    0x103228) was now executed three times.
...
5) Current instruction to execute:
0x45008: jmp RT, original branch target: 0x83000
    0x83000 maps to line number 0x20c and to entry 12
    in the cache.
    The run-time routine evicts line 0x40c and fetches
    0x20c from memory into entry 12.
    Record the fact that this branch (0x45008 –>
    0x83000) was executed once.
...

Step 64: Decide which Jump to Re-Target Based on Profile Counters

Inter-line jump 0x861d8→0x103228 was executed three times before line 0x40c was evicted.

Inter-line jump 0x44c08→0x1031f8 was executed one time before line 0x40c was evicted.

Therefore decide to not re-target jump 0x44c08→0x1031f8 (small AETBE).

Step 66: Optimized Execution

Continue execution, while re-targeting only inter-line jump 0x861d8→0x103228.

Example 3

Figure 4:
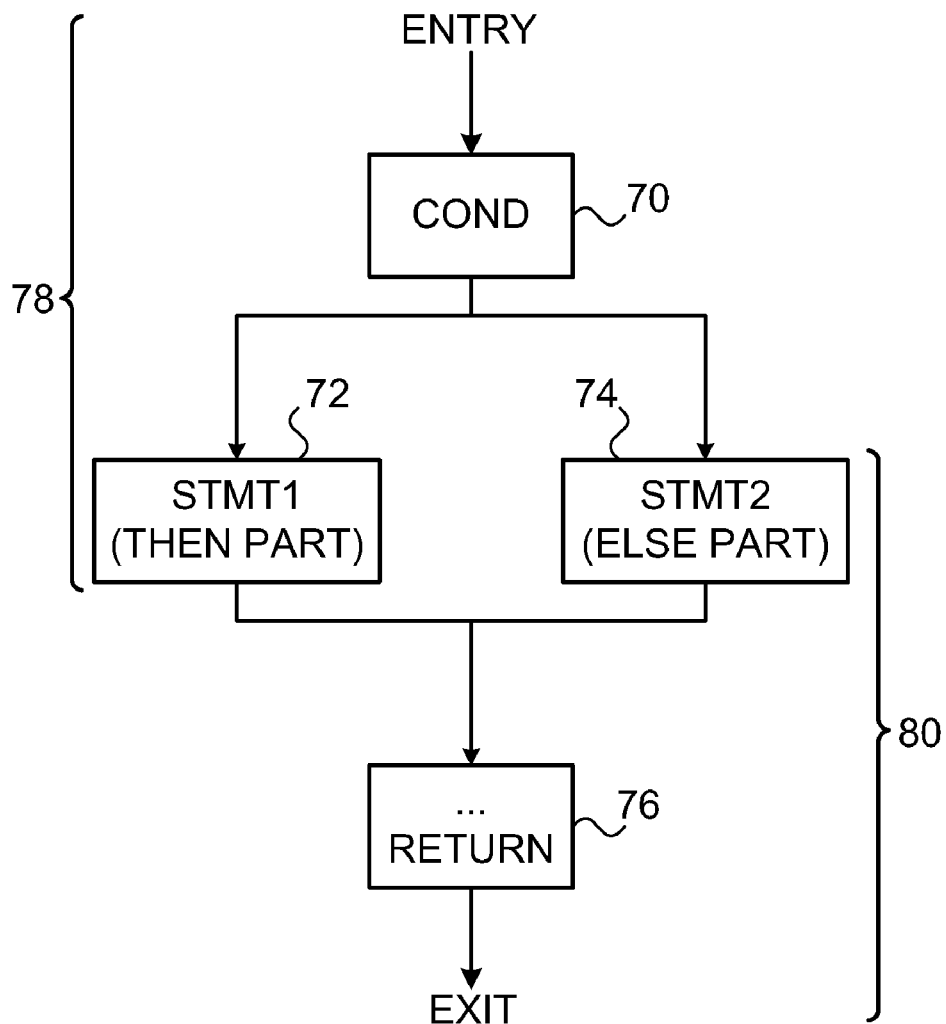
FIG. 4 is a control flow graph, which is used to schematically illustrate a method for repacking instructions into cache lines, in accordance with an embodiment of the present invention.

Execution Flow of iCached Program that Demonstrates Re-Packing of Instructions in Lines FIG. 4 is a control-flow graph that will be used to schematically illustrate a method for repacking instructions into cache lines, in accordance with an embodiment of the present invention. The graph illustrates the following IF statement:

The graph in FIG. 4 contains basic blocks 70, 72, 74 and 76, corresponding to the components of the above statement. The arrangement of the basic blocks in a line of the corresponding executable code may include block 72 (THEN part) before block 74 (ELSE part) or vice versa.

The high-level IF statement shown above may be translated into the following low-level assembly code (with the THEN part preceding the ELSE part):

```
IF (cond)
THEN
{
    Stmt1
}
ELSE
{
    Stmt2
}
...
Return
```

```
...
IF !cond jmp L1
...
Stmt1 (THEN part)
...
jmp L2
L1:
Stmt2 (ELSE part)
L2:
...
Return
```

For the sake of this example, we assume that at step 60, the IF statement is split into two parts 78 and 80, as shown in FIG. 4, which are respectively placed in two different cache lines:

```
Line 0x218 (part 78)-
    ...
    IF !cond jmp L1
    ...
    Stmt1 (THEN part)
    Branch-hint (br address->) 0x861d8 (br target->)
        0x103228
    ...
    0x861d8: jmp 0x103228 (fall-though between two
        lines)
Line 0x40c (part 80) -
    0x103228: ...
    jmp L2
    L1:
    Stmt2 (ELSE part)
    L2:
    ...
    Return
```

Step 62—Profile Collection

```
...
1) Current instruction to execute:
0x861d8: jmp RT, original branch target: 0x103228
    0x103228 maps to line number 0x40c and to entry 12
    in the iCache.
    The run-time routine fetches line 0x40c from
    memory into entry 12.
    Record the fact that this branch (0x861d8 ->
        0x103228) was executed once.
...
2) Current instruction to execute:
0x44c08: jmp RT, original branch target: 0x1031f8
    0x1031f8 maps to line number 0x40c and to entry 12
    in the cache.
    The line already exists in the iCache.
    Record the fact that this branch (0x44c08 ->
        0x1031f8) was executed once.
...
3) Current instruction to execute:
0x861d8: jmp RT, original branch target: 0x103228
    0x103228 maps to line number 0x40c and to entry 12
    in the iCache.
    The line already exists in the iCache.
    Record the fact that this branch (0x861d8 ->
        0x103228) was now executed twice.
...
4) Current instruction to execute:
0x861d8: jmp RT, original branch target: 0x103228
    0x103228 maps to line number 0x40c and to entry 12
    in the iCache.
    The line already exist in the iCache.
    Record the fact that this branch (0x861d8 ->
        0x103228) was now executed three times.
...
```

Step 64: Decide on Re-Packing of Instruction in Lines

Inter-line jump 0x861d8→0x103228 was executed three times (considered "hot" compared to the number of times the ELSE part was executed). Therefore, based on static analysis, the instructions in line 0x40c are reordered to avoid branching over the ELSE part, while line 0x218 is unchanged:

```
Line 0x218 (part 78)-
    ...
    IF !cond jmp L1
    ...
Lin
    Stmt1 (THEN part)
    ...
    0x861d8: jmp 0x103228
Line 0x40c (part 80) -
    0x103228: ...
    L2:
    ...
Lin
    Return
    L1:
    Stmt2 (ELSE part)
    jmp L2
```

Step 66: Optimized Execution

Re-link; evict the cache and continue execution.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable media may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the present invention are described herein with reference to flow chart illustrations and/or block diagrams of methods, apparatus (systems) and computer program products according to embodiments of the invention. It will be understood that each block of the flow chart illustrations and/or block diagrams, and combinations of blocks in the flow chart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow charts and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flow charts and/or block diagram block or blocks.

The flow charts and block diagrams in the figures illustrate the architecture, functionality, and operation of possible implementations of systems, methods and computer program products according to various embodiments of the present invention. In this regard, each block in the flow charts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow chart illustrations, and combinations of blocks in the block diagrams and/or flow chart illustrations, can be implemented by special purpose hardware-based systems that perform the specified functions or acts, or combinations of special purpose hardware and computer instructions.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

---

APPENDIX - PSEUDOCODE LISTING

---

Online Adaptation of Software Instruction Cache
begin
    //stage 1 - build the icached program:
    construct icached_program using the compiler and linker
    //execute the program:
    execute (icached_program)
where
proc execute(icached_program) =
    //stage 2 - profile collecting mode
    zero all entries in PROFILE_COUNTER[ ]
    Threshold ⇐ maximum value of the counters}
    while {all entries in PROFILE_COUNTER[ ] less than
        threshold do
        insn ⇐ next instruction
        if insn is inter-line branch instruction
        icacheline ⇐ line of branch target
        index ⇐ icache entry for icacheline
        if icacheline ≠ ICACHE[index]
            //handle cache miss
            If ICACHE[index] not empty
                - increase PROFILE_COUNTER[index] and
                    save information to retrieve the
                    collide lines}
                - evict ICACHE[index]}

APPENDIX - PSEUDOCODE LISTING

```
            fi
            - bring icacheline from memory to
                ICACHE[index]}
        fi
    fi
    execute insn}
od
//stage 3 - calculate new lines addresses based on profile
//counters to reduce cache entries collisions
NumOfLines ⇐ number of cache lines in the program
for i = 1 to NumOfLines step 1 do
    P[i] ← new address for line i
od
//stage 4 - continue the execution in a non-profile mode
Evict the icache}
while !end of program do
    insn ⇐ next instruction
    if insn is inter-line branch instruction which jumps to
        the run-time system
        icacheline ⇐ line of original branch target
        NewCacheLine ⇐ new address of icacheline from P
        Index ⇐ icache entry for NewCacheLine
        if NewCacheLine ≠ ICACHE[index]
            if ICACHE[index] not empty
                - evict ICACHE[index]
                - re-target jumps to ICACHE[index] back
                    to the run-time system
            fi
            - bring NewCacheLine from memory to
                ICACHE[index]
        fi
        - re-target the branch insn to jump directly to an
            address in the i-cache
    fi
    execute insn}
od
```

The invention claimed is:

1. A method for computing, comprising:

executing a program, comprising multiple cacheable lines of executable code, on a processor having a software-managed cache, wherein executing comprises fetching the cacheable lines of the executable code into cache lines of the software-managed cache according to respective cache line designations;

assembling a profile of inter-line jumps occurring in the software-managed cache while executing the program;

based on the profile, computing an optimized layout of the cacheable lines of the executable code according to a predetermined optimization criterion; and while continuing to execute the program executing a run-time cache management software program to reorder the cache line designations to establish respective new cache line designations for the cacheable lines of the executable code in accordance with the optimized layout wherein executing the program further comprises fetching the cacheable lines of the executable code into the software-managed cache in accordance with the new cache line designations, respectively and remapping interline jumps within the executable code to end in the cache lines according to the new cache line designations.

2. The method according to claim 1, wherein executing the program comprises receiving the executable code after the executable code has been compiled from source code, and wherein re-ordering the lines comprises modifying the layout of the lines without recompiling the program.

3. The method according to claim 1, wherein assembling the profile comprises counting the inter-line jumps for each of a plurality of the lines in the code.

4. The method according to claim 1, and comprising selecting one or more of the inter-line jumps for re-targeting responsively to the profile, and re-targeting the selected inter-line jumps after re-ordering the lines.

5. The method according to claim 1, wherein executing the program comprises evicting one or more of the lines of the code from the cache in order to load others of the lines into the cache, and wherein assembling the profile comprises recording evictions of each of a plurality of the lines in the code.

6. The method according to claim 5, wherein computing the optimized layout comprises finding a permutation of an original order of the lines that will reduce a number of the evictions that occur in executing the program after the lines have been re-ordered.

7. The method according to claim 1, wherein re-ordering the lines comprises evicting all of the lines of the code from the cache and re-loading the lines into the cache in accordance with the optimized layout while continuing to execute the program.

8. The method according to claim 1, wherein executing a run-time cache management software program comprises:

executing a first thread for processing the inter-line jumps in an original version of the executable code; and executing a second thread for relinking the executable code to revise the inter-line jumps.

9. Computing apparatus, comprising:

a memory; and one or more processors, comprising at least one processor that is configured to maintain a software-managed cache in the memory and to execute a program comprising multiple cacheable lines of executable code, and to perform the steps of:

fetching the cacheable lines of the executable code into cache lines of the software-managed cache according to respective cache line designations;

assembling a profile of inter-line jumps occurring in the software-managed cache while executing the program;

based on the profile, computing an optimized layout of the cacheable lines of the executable code according to a predetermined optimization criterion; and while continuing to execute the program executing a run-time cache management software program to reorder the cache line designations to establish respective new cache line designations for the cacheable lines of the executable code in accordance with the optimized layout wherein executing the program further comprises fetching the cacheable lines of the executable code into the software-managed cache in accordance with the new cache line designations, respectively and remapping interline jumps within the executable code to end in the cache lines according to the new cache line designations.

10. The apparatus according to claim 9, wherein the program comprises executable code that has been compiled from source code, and wherein the one or more processors are configured to re-order the lines without recompiling the program.

11. The apparatus according to claim 9, wherein the one or more processors are configured to find, responsively to the profile, a permutation of an original order of the lines that will enhance an efficiency of executing the program after the lines have been re-ordered.

12. A computer software product, comprising a tangible non-transitory computer-readable medium in which software instructions are stored, which instructions, when read by a processor having a software-managed cache, cause the processor to perform the steps of:

executing a program, comprising multiple cacheable lines of executable code, wherein executing comprises fetching the cacheable lines of the executable code into cache lines of the software-managed cache according to respective cache line designations;

assembling a profile of inter-line jumps occurring in the software-managed cache while executing the program;

based on the profile, computing an optimized layout of the cacheable lines of the executable code according to a predetermined optimization criterion; and while continuing to execute the program executing a runtime cache management software program to reorder the cache line designations to establish respective new cache line designations for the cacheable lines of the executable code in accordance with the optimized layout wherein executing the program further comprises fetching the cacheable lines of the executable code into the software-managed cache in accordance with the new cache line designations, respectively and remapping interline jumps within the executable code to end in the cache lines according to the new cache line designations.

13. The product according to claim 12, wherein the program comprises executable code that has been compiled from source code, and wherein the instructions cause the processor to re-order the lines without recompiling the program.

14. The product according to claim 12, wherein the instructions cause the processor to count the inter-line jumps for each of a plurality of the lines in the code.

15. The product according to claim 12, wherein the instructions cause the processor to find, responsively to the profile, a permutation of an original order of the lines that will enhance an efficiency of executing the program after the lines have been re-ordered.

16. The product according to claim 12, wherein the instructions cause the processor to select, responsively to the profile, one or more of the inter-line jumps for re-targeting, and to re-target the selected inter-line jumps after re-ordering the lines.

17. The product according to claim 12, wherein the processor, in executing the program, evicts one or more of the lines of the code from the cache in order to load others of the lines into the cache, and wherein the instructions cause the processor to record evictions of each of a plurality of the lines in the code and to use the recorded evictions in computing the optimized layout.

18. The product according to claim 17, wherein the instructions cause the processor to compute an average number of times an inter-line jump is executed before an eviction occurs with respect to a given line.

19. The product according to claim 17, wherein the optimized layout comprises a permutation of an original order of the lines that will reduce a number of the evictions that occur in executing the program after the lines have been re-ordered.

20. The product according to claim 12, wherein the instructions cause the processor to evict all of the lines of the code from the cache and to re-load the lines into the cache in accordance with the optimized layout while continuing to execute the program.

21. The product according to claim 12, wherein each of the cacheable lines of the program comprises multiple instructions, and wherein computing the optimized layout comprises repacking the instructions in one or more of the cacheable lines wherein the predetermined optimization criterion comprises a minimum number of evictions.

* * * * *